(12) United States Patent
Kelly et al.

(10) Patent No.: US 10,487,757 B2
(45) Date of Patent: Nov. 26, 2019

(54) METHOD AND SYSTEM FOR AIR FLOW THROUGH AN ENGINE HAVING COMPRESSORS

(71) Applicant: Ford Global Technologies, LLC, Dearborn, MI (US)

(72) Inventors: Tyler Kelly, Plymouth, MI (US); Timothy Stolzenfeld, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 106 days.

(21) Appl. No.: 15/791,125

(22) Filed: Oct. 23, 2017

(65) Prior Publication Data

US 2019/0120150 A1   Apr. 25, 2019

(51) Int. Cl.

| | | |
|---|---|---|
| *F02B 37/16* | (2006.01) | |
| *F02B 37/04* | (2006.01) | |
| *F02B 39/10* | (2006.01) | |
| *F02B 37/007* | (2006.01) | |
| *F02B 37/013* | (2006.01) | |
| *F02D 41/00* | (2006.01) | |
| *F02B 33/40* | (2006.01) | |
| *F02B 37/00* | (2006.01) | |

(Continued)

(52) U.S. Cl.
CPC .......... *F02D 41/0007* (2013.01); *F02B 33/40* (2013.01); *F02B 37/001* (2013.01); *F02B 37/007* (2013.01); *F02B 37/04* (2013.01); *F02B 37/162* (2019.05); *F02B 39/10* (2013.01); *F02D 11/02* (2013.01); *F02D 41/18* (2013.01); *F02B 37/004* (2013.01); *F02B 37/013* (2013.01)

(58) Field of Classification Search
CPC .......... F02B 37/001–004; F02B 37/007; F02B 37/013; F02B 37/04–105; F02B 37/16–168
See application file for complete search history.

(56) References Cited

U.S. PATENT DOCUMENTS

| | | | | |
|---|---|---|---|---|
| 4,299,090 A | * | 11/1981 | Deutschmann | ....... F02B 37/007 60/606 |
| 8,453,447 B2 | * | 6/2013 | Barth | .................... F02B 37/001 60/612 |

(Continued)

FOREIGN PATENT DOCUMENTS

| | | | | |
|---|---|---|---|---|
| DE | 102004038172 A1 | * | 2/2006 | ............ F02B 37/001 |
| DE | 102006011188 A1 | * | 9/2007 | .......... F02B 29/0412 |

(Continued)

OTHER PUBLICATIONS

Xiao, Baitao et al., "Method and System for a Boosted Engine," U.S. Appl. No. 15/693,038, filed Aug. 31, 2017, 71 pages.

(Continued)

*Primary Examiner* — Laert Dounis
(74) *Attorney, Agent, or Firm* — Geoffrey Brumbaugh; McCoy Russell LLP (57) ABSTRACT

Methods and systems for operating an engine that includes four compressors for two cylinder banks are described. In one example, output of two compressors and positions of valves are adjusted responsive to an engine air flow amount to prevent air from back flowing through a compressor. Output from the two compressors may be combined for higher engine air flow amounts.

17 Claims, 6 Drawing Sheets

(51) Int. Cl.
*F02D 11/02* (2006.01)
*F02D 41/18* (2006.01)

(56) References Cited

U.S. PATENT DOCUMENTS

| | | | |
|---|---|---|---|
| 2013/0008161 A1* | 1/2013 | Flohr | F02B 37/001 |
| | | | 60/600 |
| 2014/0127002 A1 | 5/2014 | Joergl et al. | |
| 2014/0230430 A1* | 8/2014 | Krug | F02B 29/0412 |
| | | | 60/600 |
| 2014/0260239 A1* | 9/2014 | Genter | F02B 37/004 |
| | | | 60/599 |
| 2016/0319730 A1* | 11/2016 | Kemmerling | F02B 37/164 |
| 2017/0138278 A1 | 5/2017 | Xiao et al. | |
| 2018/0016968 A1* | 1/2018 | Ablinger | F02B 37/001 |
| 2019/0186390 A1* | 6/2019 | Kelly | F02D 41/0007 |

FOREIGN PATENT DOCUMENTS

| | | | | |
|---|---|---|---|---|
| DE | 102012212173 A1 * | 5/2014 | | F02C 6/12 |
| FR | 2904365 A1 * | 2/2008 | | F02B 37/001 |
| WO | WO-2012123629 A1 * | 9/2012 | | F01N 13/107 |

OTHER PUBLICATIONS

Xiao, Baitao et al., "Method and System for a Boosted Engine," U.S. Appl. No. 15/693,125, filed Aug. 31, 2017, 73 pages.

\* cited by examiner

METHOD AND SYSTEM FOR AIR FLOW THROUGH AN ENGINE HAVING COMPRESSORS

FIELD

The present description relates to methods and systems for controlling air flow through an internal combustion engine. The methods and systems may be implemented via an engine that includes multiple engine intake compression devices.

BACKGROUND AND SUMMARY

An engine may include one or more compression devices for each cylinder bank. The compression devices may enable increased engine performance by increasing an amount of air that may enter engine cylinders. In one example, a first compressor may supply a first amount of air to the engine and a second compressor may supply a second amount of air to the engine. The first amount of air may be equal to the second amount of air, or the first amount of air may be different from the second amount of air. If the first amount of air is different than the second amount of air, different pressure ratios may develop across the first and second compressors. As a result, it may be possible for air to flow backward through one of the compressors, thereby reducing compressor efficiency and engine air flow. While it may be possible to closed-loop control each of the two compressors so that the two compressors provide a substantially same amount of air to the engine, the closed-loop control may be difficult to apply and it may increase system cost more than is desired.

The inventors herein have recognized the above-mentioned disadvantages and have developed a method for operating an engine, comprising: adjusting speed of a third compressor and a position of a valve in response to an engine air flow amount, the third compressor and the valve positioned in an air intake of an engine upstream of an engine throttle, the third compressor positioned in the air intake downstream of first and second compressors.

By adjusting speed of a third compressor and a position of a valve in an engine air intake, it may be possible to provide a desired air flow to an engine without inducing back flow through a compressor that has a lower pressure ratio than the third compressor and that is positioned in parallel with the third compressor. For example, at middle level engine air flow amounts, all air entering an engine may flow through the third compressor and air flow through a path in the engine intake that is in parallel with the third compressor may be ceased since the third compressor has capacity to meet the request boost and engine air flow. Consequently, air may not flow back through a fourth compressor located in the parallel path, thereby avoiding air back flow in the fourth compressor at middle level engine air flow amounts. As such, closed loop control of the third and fourth compressors at middle engine air flow amounts may be avoided. If the engine air flow amount is increased to a higher level, the valve may be opened so that the fourth compressor may further increase engine air flow, and since flow rates through both the third and fourth compressors is high, the possibility of backflow through one of the third and fourth compressors may be reduced.

The present description may provide several advantages. Specifically, the approach may simplify compressor control for an engine and improve system response. In addition, the approach may reduce system electrical consumption when the engine compressors are electrically driven. Further, the approach may be applied to systems where the compressors are mechanically driven or electrically driven.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
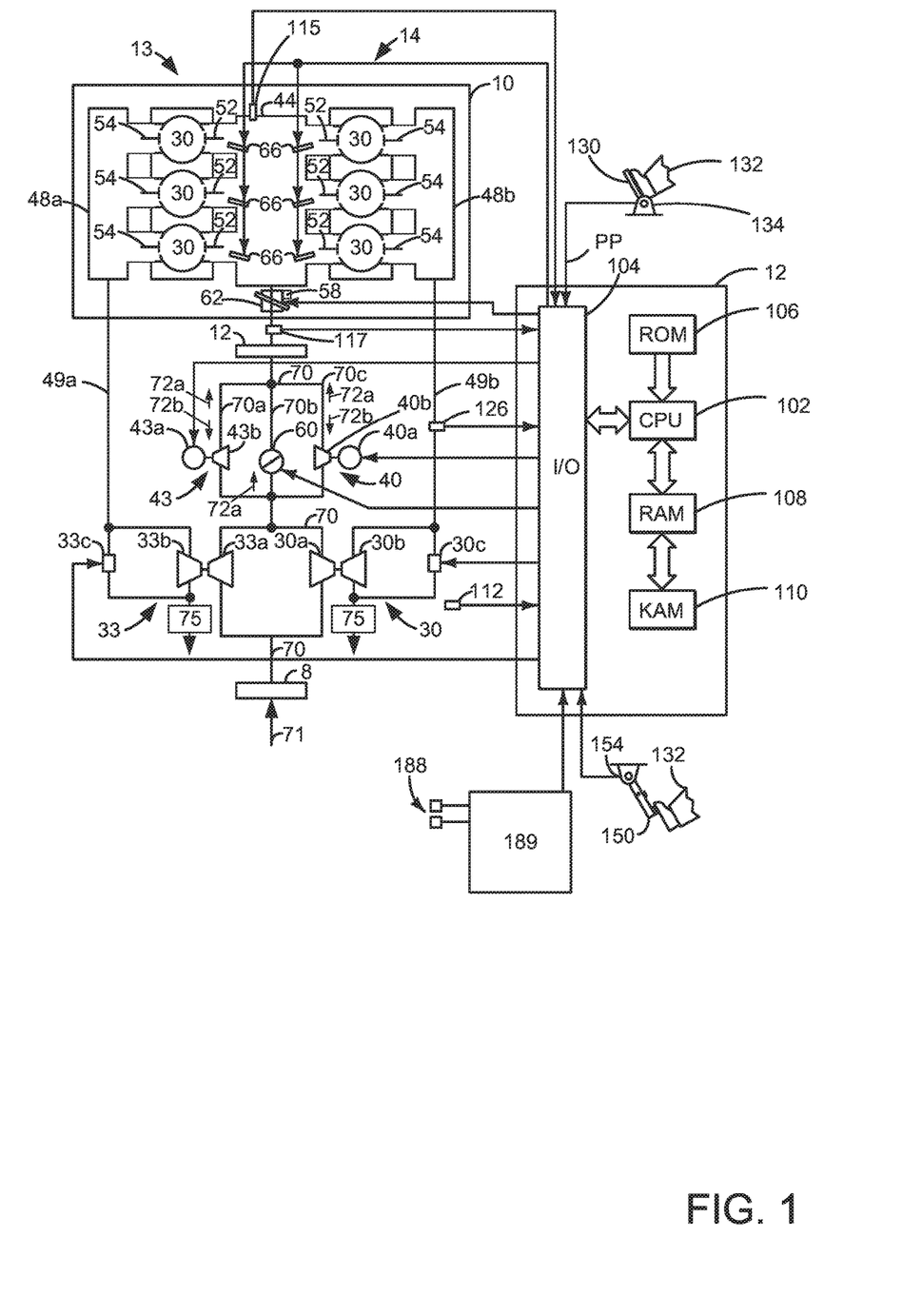
FIG. 1 is a schematic diagram of a first example engine.
Figure 2:
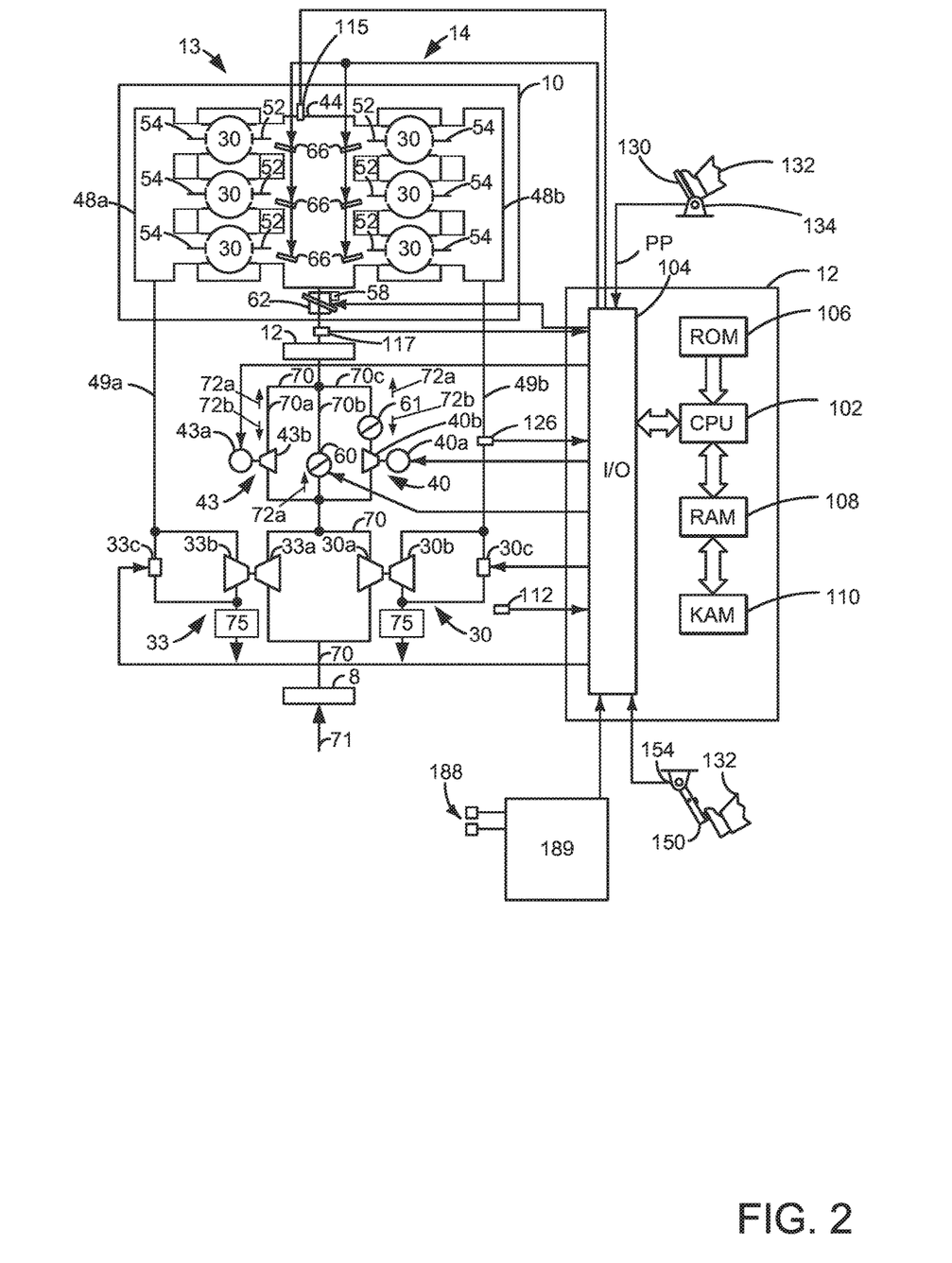
FIG. 2 is a schematic diagram of a second example engine.
Figure 5:
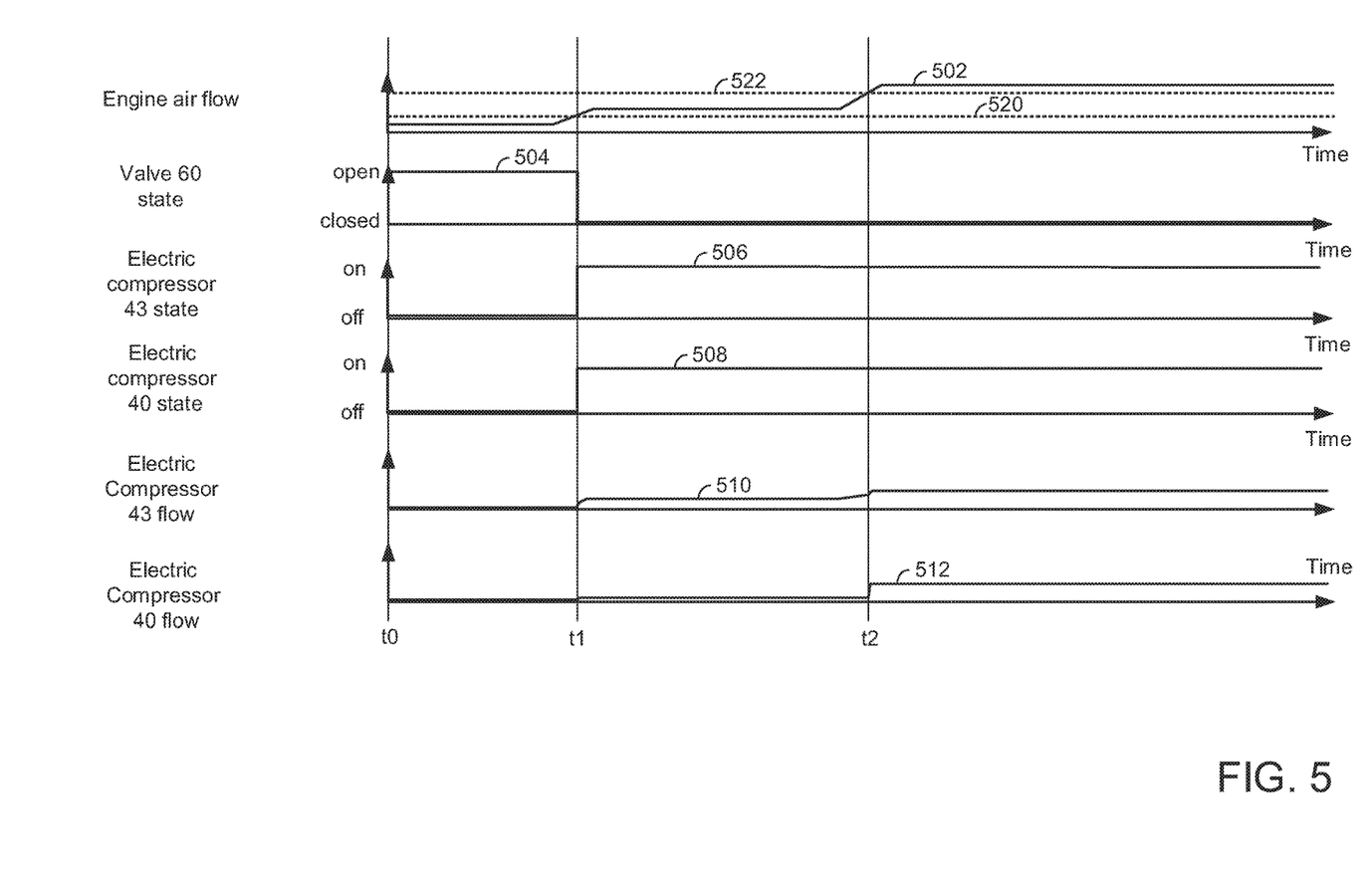
FIGS. 5 and 6 are example engine operating sequences according to the methods of FIGS. 3 and 4.
Figure 6:
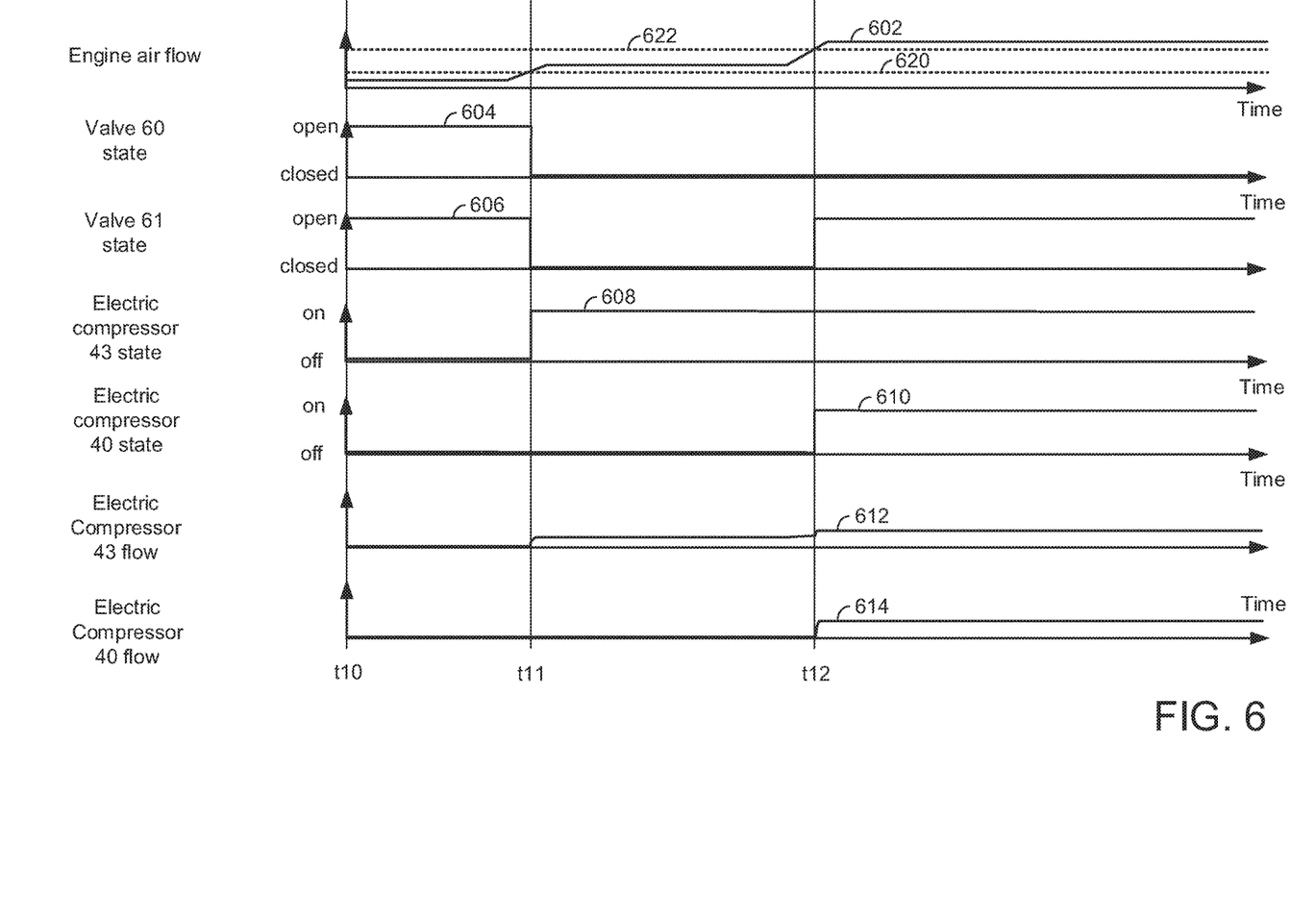

The present description is related to operating an engine that includes a plurality of compression devices. In one example, the engine includes four compressors for supplying air to an internal combustion engine as is shown in FIGS. 1 and 2. The engine may also include one or two intake passage control valves and a throttle. The compressors may be electrically or mechanically driven. The engine and its associated compressors may be controlled according to the methods described via the state machines of FIGS. 3 and 4. The engine system and compressors may operate as shown in the sequences of FIGS. 5 and 6.

Referring to FIG. 1, internal combustion engine 10, comprising a plurality of cylinders 30 is shown in FIG. 1. Engine 10 is controlled by electronic engine controller 12. Engine 10 includes a plurality of cylinders, each of which include a piston (not shown) positioned therein and connected to a crankshaft (not shown). Engine 10 may be rotated via a starter motor (not shown) to start the engine and combustion of air and fuel within engine 10. Cylinders 30 are shown in pneumatic communication with intake manifold 44, left exhaust manifold 48a associated with first cylinder bank 13, and right exhaust manifold 48b associated with second cylinder bank 14. Cylinders 30 are shown communicating with intake manifold 44 and exhaust manifold 48a and 48b via respective intake poppet valves 52 and exhaust poppet valves 54. Each intake and exhaust valve may be operated by an intake cam (not shown) and an exhaust cam (not shown).

Exhaust may flow from left exhaust manifold 48a via passage 49a to left turbocharger 33. Exhaust gases may spin turbine 33b of left turbocharger 33 to rotate compressor 33a of left turbocharger 33. Controller 12 may regulate speed and air flow through left turbocharger 33 via adjusting a position of waste gate 33c. Similarly, exhaust may flow from right exhaust manifold 48*b* via passage 49*b* to right turbocharger 30. Exhaust gases may spin turbine 30*b* of right turbocharger 30 to rotate compressor 30*a* of right turbocharger 30. Controller 12 may regulate speed and air flow through left turbocharger 30 via adjusting a position of waste gate 30*c*. Left compressor 33*a* and right compressor 30*c* draw air from air inlet 71 through air filter 8 and air intake passage 70. Further, left compressor 33*a* and right compressor 30*c* provide pressurized air to left electrically driven compressor 43, right electrically driven compressor 40, and valve 60 in air intake passage 70. Compressor 43*b* is driven via electric machine 43*a* and right compressor 40*b* is driven via an electric machine 40*a*. Engine air intake passage 70 includes a first air path 70*a* through left compressor 43*b*, a second air path 70*b* through valve 60, and a third air path 70*c* through right compressor 40*b*. Passages 70*a*, 70*b*, and 70*c* are arranged in parallel and recombine to form single passage 70 just before charge air cooler 12. Thus, compressors 33*a* and 30*a* may provide compressed air to compressors 43*b* and 40*b*. Compressors 43*b* and 40*b* may supply compressed air to engine 10 via throttle 62. Air flows from air filter 8 to throttle 62. Thus, air filter is located upstream of compressors 33*a* and 30*a* according to a direction of air flow into engine 10. Further, compressors 33*a* and 30*a* are located upstream of compressors 43*b* and 40*b* according to the direction of air flow into engine 10. Similarly, compressors 43*b* and 40*b* are located upstream of throttle 62 according to the direction of air flow into engine 10. In alternative examples, compressors 43*b* and 40*b* may be mechanically driven via exhaust gases or an engine crankshaft. Forward air flow through compressors 43*b* and 40*b* is indicated by arrows 72*a*. Backward air flow or back flow through compressors 43*b* and 40*b* is indicated by arrows 72*b*.

Fuel injectors 66 are shown positioned to inject fuel into cylinder 30. Fuel may be directly or port injected. Fuel injector 66 delivers liquid fuel in proportion to the pulse width of signal from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures. In addition, intake manifold 44 is shown communicating with electronic throttle 62 which adjusts a position of throttle plate 64 to control air flow from engine air intake passage 70 to intake manifold 44.

Engine 10 may be a compression ignition engine or it may include a distributorless ignition system (not shown) to provide ignition sparks to cylinders 30 via spark plugs (not shown) in response to controller 12. Universal Exhaust Gas Oxygen (UEGO) sensor 126 shown coupled to exhaust manifold 48 upstream of catalytic converter 75.

Converter 75 can include multiple catalyst bricks, in one example. In another example, multiple emission control mechanisms, each with multiple bricks, can be used. Converter 75 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112; a position sensor 134 coupled to an accelerator pedal 130 for sensing force applied by human driver 132; a measurement of engine manifold pressure (MAP) from pressure sensor 115 coupled to intake manifold 44; a measurement of air mass entering the engine from sensor 117; brake pedal position from brake pedal position sensor 154 when human driver 132 applies brake pedal 150; and a measurement of throttle position from sensor 58.

In some examples, a driver demand torque may be provided via autonomous vehicle controller 189. Autonomous vehicle controller may determine a driver demand torque responsive to sensors 188. Sensors 188 may include but are not limited to cameras, laser range finding sensors (e.g., LIDAR), global positioning system sensors (GPS), and RADAR.

Controller 12 may also interface with vehicle occupants via human/machine interface 133. Human/machine interface 133 may comprise a visual display that provides visual feedback to vehicle occupants and receives input from vehicle occupants.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into cylinders 30 via intake manifold 44, and pistons (not shown) move to the bottom of the cylinder so as to increase the volume within cylinder 30. The position at which the piston is near the bottom of the cylinder and at the end of its stroke (e.g. when cylinder 30 is at its largest volume) is typically referred to by those of skill in the art as bottom dead center (BDC). During the compression stroke, intake valve 52 and exhaust valve 54 are closed. The piston (not shown) moves toward the cylinder head so as to compress the air within cylinders 30. The point at which the piston is at the end of its stroke and closest to the cylinder head (e.g. when cylinder 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as a spark plug or compression, resulting in combustion. During the expansion stroke, the expanding gases push the piston back to BDC. A crankshaft (not shown) converts piston movement into a rotational torque of the rotary shaft. Finally, during the exhaust stroke, the exhaust valves 54 open to release the combusted air-fuel mixture to exhaust manifolds 48*a* and 48*b* as the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, a schematic diagram of a second example engine is shown. The engine shown in FIG. 2 includes components and devices that are the same and operate in a same way as the devices and components shown in FIG. 1. The components and devices of FIG. 2 that are equivalent to the components and devices of FIG. 1 are identified with the same numeric labels used in FIG. 1. Therefore, for the sake of brevity, the description of same components is omitted.

In this engine configuration, engine 10 includes a second valve 61 that is positioned in passage 70*c*. Second valve 61 may completely seal off passage 70*c* so that air may not flow backward through compressor 40*b* (e.g., in a direction from valve 61 to 40*b*) by way of compressed air supplied via compressor 43*a*. The positions of valves 60 and 61 are adjusted via controller 12. Thus, valves 60 and 61 may be adjusted as described in greater detail in the methods of FIGS. 3 and 4 to reduce the possibility of backflow through one or more compressors.

The systems of FIGS. 1 and 2 may provide for a vehicle system, comprising: an engine including two cylinder banks and four compressors, a first compressor and a second compressor of the four compressors positioned upstream of a third compressor and a fourth compressor included in the four compressors, the third compressor positioned in a first intake passage, the fourth compressor positioned in a third intake passage, and a first valve positioned in a second intake passage, the first, second, and third intake passages arranged in parallel. The vehicle system further comprises a second valve, the second valve positioned in the third intake passage, the first, second, and third intake passages arranged upstream of an engine throttle. The vehicle system includes where the third and fourth compressors are electrically driven compressors. The vehicle system further comprises a controller including executable instructions stored in non-transitory memory to adjust a position of the first valve in response to an engine air flow amount. The vehicle system further comprises additional instructions to adjust a position of the second valve in response to an engine air flow amount. The vehicle system further comprises instructions to operate the third and fourth compressors at different speeds in response to an engine air flow amount.

Figure 3:
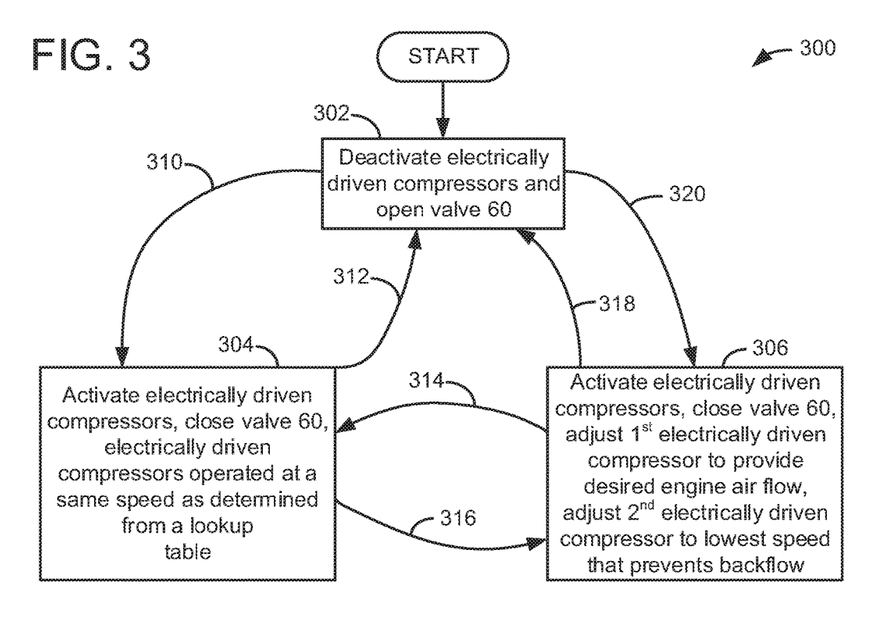
FIGS. 3 and 4 are example method for controlling air flow through the first and second example engines.

Referring now to FIG. 3, a first example method for the system of FIG. 1 to control engine air flow is shown. The method of FIG. 3 may be incorporated into and may cooperate with the system of FIG. 1. Further, at least portions of the method of FIG. 3 may be incorporated as executable instructions stored in non-transitory memory while other portions of the method may be performed via a controller transforming operating states of devices and actuators in the physical world.

The method of FIG. 3 is depicted in the form of a state machine that includes three distinct operating states 302, 304, and 306. Method 300 may move between the operating states via paths 310, 312, 314, 316, 318, and 320. The paths may be negotiated when conditional requirements are met.

Method 300 begins by entering operating state 302 where compressors 43b and 40b are deactivated (e.g., not supplied with mechanical or electrical energy). If the compressors are electrically driven, electrical power may not be allowed to rotate the compressors. Further, in some examples, electric machines 43a and 40a may be operated in a generator mode to resist force that may be applied to compressors 43b and 40b via air that is pressurized via compressors 33a and 30a so that air flow through compressors 43b and 40b may be resisted. In still other examples, compressors 43b and 40b may be rotated via electric machines 43a and 40a at a predetermined low speed (e.g., less than 100 RPM). If compressors 43b and 40b are mechanically driven, clutches may be opened to prevent them from moving. Valve 60 is also opened to provide a low resistance air flow path between compressors 33a and 30b and charge air cooler 12. By opening valve 60 and deactivating compressors 43b and 40b, electrical energy consumption may be reduced. The engine may be operated in state 302 when engine air flow is less than a first threshold amount (e.g., less than 1 kilograms/minute). State 302 may be entered from state 304 via path 312 when engine air flow or desired engine air flow is less than the first threshold amount. Alternatively, state 302 may be entered from state 306 via path 318 when engine air flow or desired engine air flow is less than the first threshold amount.

The engine air flow amount may be determined via an air flow sensor and the desired engine air flow amount may be determined from a driver demand torque. The driver demand torque may be determined from accelerator pedal position via referencing a table or function of empirically determined values of torque using accelerator pedal position. Alternatively, the driver demand torque may be provided via a controller, such as an autonomous vehicle controller. The torque amount may then be converted to an engine air amount via referencing a table or function that outputs empirically determined engine air amounts responsive to the engine torque amount.

At state 304, method 300 activates (e.g., supplies electrical or mechanical energy) both compressors 43b and 40b to increase air flow to engine 10. Valve 60 is closed so that air does not return back to the inlet side of compressors 43b and 40b. Compressors 43b and 40b are commanded to same speeds to balance air flow through the two compressors and the speed of the compressors may be determined via retrieving speeds from a lookup table. The compressor speed values in the table may be empirically determined and referenced via engine air flow or desire engine air flow and engine speed. In one example, the desired engine air flow may be determined from accelerator pedal position and engine speed. State 304 may be entered from state 302 via path 310 when engine air flow or desired engine air flow exceeds a second threshold amount (e.g., 3.5 kilograms/minute). Alternatively, state 304 may be entered from state 306 via path 314 when engine air flow or desired engine air flow exceeds the second threshold amount.

At state 306, method 300 activates compressor 43b and operates compressor 40b at a low speed to increase air flow to engine 10 and reduce the possibility of back flow (e.g., air flowing backward in the direction of 72b) through compressor 40b. In addition, valve 60 is closed so that air does not return back to the inlet side of compressors 43b and 40b. Compressor 43b is adjusted to a speed that provides the desired engine air flow. Compressor 43b is commanded to a speed determined by retrieving the speed from a lookup table. The compressor speed values in the table may be empirically determined and referenced via engine air flow or desire engine air flow and engine speed. In one example, the desired engine air flow may be determined from accelerator pedal position or virtual driver demand torque (e.g., a torque request provided via an autonomous vehicle controller) and engine speed. State 306 may be entered from state 302 via path 320 when engine air flow or desired engine air flow exceeds the first threshold amount and is less than the second threshold amount. Alternatively, state 306 may be entered from state 304 via path 316 when engine air flow or desired engine air flow exceeds is less than the second threshold amount and is greater than the first threshold amount.

Thus, in the system shown in FIG. 1, the possibility of air flowing backward through compressors 43b and 40b may be reduced via installing a valve 60 in an engine air intake passage 70 that is in parallel with compressors 43b and 40b. Further, by controlling energy flow to compressors 43b and 40b, it may be possible to reduce energy consumption by allowing compressor 43b to provide a total boost request in operating regions where it is possible to do so and by allowing compressor 40b to rotate at a lower speed threshold that prevents backflow through compressor 43b.

Figure 4:
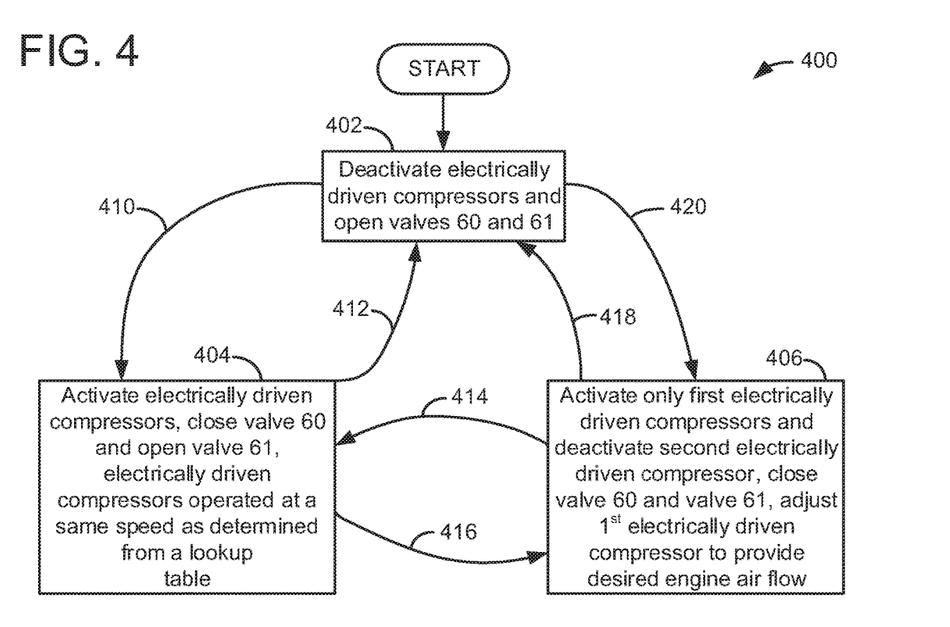

Referring now to FIG. 4, a second example method for the system of FIG. 2 to control engine air flow is shown. The method of FIG. 4 may be incorporated into and may cooperate with the system of FIG. 1. Further, at least portions of the method of FIG. 4 may be incorporated as executable instructions stored in non-transitory memory while other portions of the method may be performed via a controller transforming operating states of devices and actuators in the physical world.

The method of FIG. 4 is depicted in the form of a state machine that includes three distinct operating states 402, 404, and 406. Method 400 may move between the operating states via paths 410, 412, 414, 416, 418, and 420. The paths may be negotiated when conditional requirements are met.

Method 400 begins by entering operating state 402 where compressors 43b and 40b are deactivated (e.g., not supplied with mechanical or electrical energy). If the compressors are electrically driven, electrical power may not be allowed to rotate the compressors. Further, in some examples, electric machines 43a and 40a may be operated in a generator mode to resist force that may be applied to compressors 43b and 40b via air that is pressurized via compressors 33a and 30a so that air flow through compressors 43b and 40b may be resisted. In still other examples, compressors 43b and 40b may be rotated via electric machines 43a and 40a at a predetermined low speed (e.g., less than 100 RPM). If compressors 43b and 40b are mechanically driven, clutches may be opened to prevent them from moving. Valve 60 is also opened to provide a low resistance air flow path between compressors 33a and 30b and charge air cooler 12. By opening valve 60 and deactivating compressors 43b and 40b, electrical energy consumption may be reduced while back flow through compressors 43b and 40b may be reduced or eliminated. In one example, valve 61 is opened to allow compressor 40b to provide boost or closed to prevent backflow through compressor 40b. The engine may be operated in state 402 when engine air flow is less than a first threshold amount (e.g., less than 1 kilograms/minute). State 402 may be entered from state 404 via path 412 when engine air flow or desired engine air flow is less than the first threshold amount. Alternatively, state 402 may be entered from state 406 via path 418 when engine air flow or desired engine air flow is less than the first threshold amount.

At state 404, method 400 activates (e.g., supplied electrical or mechanical energy) both compressors 43b and 40b to increase air flow to engine 10. Valve 60 is closed so that air does not return back to the inlet side of compressors 43b and 40b and valve 61 is opened to allow air flow through compressor 40b. Compressors 43b and 40b are commanded to same speeds to balance air flow through the two compressors and the speed of the compressors may be determined via retrieving speeds from a lookup table. The compressor speed values in the table may be empirically determined and referenced via engine air flow or desire engine air flow and engine speed. In one example, the desired engine air flow may be determined from accelerator pedal position and engine speed. State 404 may be entered from state 402 via path 410 when engine air flow or desired engine air flow exceeds a second threshold amount (e.g., 3.5 kilograms/minute). Alternatively, state 404 may be entered from state 406 via path 414 when engine air flow or desired engine air flow exceeds the second threshold amount.

At state 406, method 300 activates compressor 43b and deactivates compressor 40b to increase air flow to engine 10 and reduce the possibility of back flow (e.g., air flowing backward in the direction of 72b) through compressor 40b. In addition, valves 60 and 61 are closed so that air does not return back to the inlet side of compressors 43b and 40b. Compressor 43b is adjusted to a speed that provides the desired engine air flow. Compressor 43b is commanded to a speed determined by retrieving the speed from a lookup table. The compressor speed values in the table may be empirically determined and referenced via engine air flow or desire engine air flow and engine speed. In one example, the desired engine air flow may be determined from accelerator pedal position and engine speed. State 406 may be entered from state 402 via path 420 when engine air flow or desired engine air flow exceeds the first threshold amount and is less than the second threshold amount. Alternatively, state 406 may be entered from state 404 via path 416 when engine air flow or desired engine air flow exceeds is less than the second threshold amount and is greater than the first threshold amount.

Thus, in the system shown in FIG. 2, the possibility of air flowing backward through compressors 43b and 40b may be reduced via installing a valve 60 in an engine air intake passage 70 that is in parallel with compressors 43b and 40b. Valve 61 is placed in series with compressor 40b and in parallel with compressor 43b. Further, by controlling energy flow to compressors 43b and 40b, it may be possible to reduce energy consumption by closing valve 61 to allow compressor 43b to deliver a total desired boost in operating states where compressor 43b has capacity to provide the total boost (e.g., at low boost request conditions).

The methods of FIGS. 3 and 4 provide for a method for operating an engine, comprising: adjusting speed of a third compressor and a position of a valve in response to an engine air flow amount, the third compressor and the valve positioned in an air intake of an engine upstream of an engine throttle, the third compressor positioned in the air intake downstream of a first compressor and a second compressor. The method includes where the first and second compressors are compressors of turbochargers. Further, the compressors shown in FIGS. 1 and 2 may be turbocharger compressors (e.g., exhaust driven), supercharger compressors (e.g., mechanically driven via the engine crankshaft or camshaft), or electrically driven compressors. The method includes where adjusting the position of the valve includes closing the valve in response to the engine air flow amount exceeding a second threshold amount and opening the valve in response to the engine air flow amount being less than the second amount. The method includes where closing the valve closes an air passage that is in parallel with an air passage that includes the third compressor. The method includes where the air passage is in parallel with an air passage that includes a fourth compressor. The method further comprises adjusting speed of a fourth compressor in response to the engine air flow amount exceeding a second threshold level. The method further comprises adjusting the engine air flow amount in response to accelerator pedal position or a torque demand from an autonomous vehicle controller.

The methods of FIGS. 3 and 4 provide for a method for operating an engine, comprising: adjusting speed of a third compressor and a position of a first valve and a position of a second valve in response to an engine air flow amount, the third compressor positioned in a first air intake passage and the first valve positioned in a second air intake passage of an engine located upstream of an engine throttle, the third compressor positioned in the first air intake passage downstream of a first compressor and a second compressor. The method includes where the second valve is positioned in a third air intake passage that is in parallel with the first and second air intake passages. The method further comprises a fourth compressor positioned in the third air intake passage. The method includes where adjusting the position of the first valve and the position of the second valve includes closing the first valve and closing the second valve in response to the engine air flow amount exceeding a first threshold level. The method includes where adjusting the position of the first valve and the position of the second valve includes opening the first valve and opening the second valve in response to the engine air flow amount being less than a first threshold level. The method includes where adjusting the position of the first valve and the position of the second valve includes closing the first valve and opening the second valve in response to the engine air flow amount exceeding a second threshold level. The method further comprises adjusting a speed of a fourth compressor to match to a speed of the third compressor in response to the engine air flow amount exceeding the second threshold level.

Referring now to FIG. 5, a first example engine operating sequence is shown. The sequence of FIG. 5 may be performed via the system of FIG. 1 in cooperation with the method of FIG. 3. The plots shown are time aligned and occur at a same time. Vertical lines at time t1-t2 represent times of interest during the sequence.

The first plot from the top of FIG. 5 is a plot of engine air flow, or alternatively desired engine air flow, versus time. Trace 502 represents engine air flow. The vertical axis represents engine air flow and engine air flow amount increases in the direction of the vertical axis arrow. The horizontal axis represents time and time increases from the left side of the figure to the right side of the figure. Horizontal line 520 represents a first threshold engine air flow amount and horizontal line 522 represents a second threshold engine air flow amount.

The second plot from the top of FIG. 5 is a plot of valve 60 state versus time. Trace 504 represents valve 60 state. The vertical axis represents valve 60 state and valve 60 is open to allow air flow through the valve when trace 504 is at a higher level near the open label. The valve 60 is closed to prevent air flow through the valve 60 when trace 504 is at a lower level near the closed label. The horizontal axis represents time and time increases from the left side of the figure to the right side of the figure.

The third plot from the top of FIG. 5 is a plot of electric compressor 43 state versus time. Trace 506 represents electric compressor 43 state. The vertical axis represents compressor 43 state and compressor 43 is activated (e.g., supplied with electrical or mechanical power) when trace 506 is at a higher level near the on label. The compressor 43 is deactivated (e.g., not supplied with electrical or mechanical power) when trace 506 is at a lower level near the off label. The horizontal axis represents time and time increases from the left side of the figure to the right side of the figure.

The fourth plot from the top of FIG. 5 is a plot of electric compressor 40 state versus time. Trace 508 represents electric compressor 40 state. The vertical axis represents compressor 40 state and compressor 40 is activated (e.g., supplied with electrical or mechanical power) when trace 508 is at a higher level near the on label. The compressor 40 is deactivated (e.g., not supplied with electrical or mechanical power) when trace 508 is at a lower level near the off label. The horizontal axis represents time and time increases from the left side of the figure to the right side of the figure.

The fifth plot from the top of FIG. 5 is a plot of compressor 43 versus time. Trace 510 represents compressor 43 air flow. The vertical axis represents compressor 43 air flow and compressor 43 air flow amount increases in the direction of the vertical axis arrow. The horizontal axis represents time and time increases from the left side of the figure to the right side of the figure.

The sixth plot from the top of FIG. 5 is a plot of compressor 40 versus time. Trace 512 represents compressor 40 air flow. The vertical axis represents compressor 40 air flow and compressor 40 air flow amount increases in the direction of the vertical axis arrow. The horizontal axis represents time and time increases from the left side of the figure to the right side of the figure.

At time t0, the engine air flow is less than first threshold 520. Valve 60 is opened and compressors 43 and 40 are deactivated in response to the engine air flow amount. Air flow through compressors 43 and 40 is very low since the compressors are deactivated. By opening valve 60, compressors 33 and 30 may supply air to engine 10 via a low resistance air passage.

Between time t0 and time t1, the engine air flow is maintained at a constant value, but near time t1, the engine air flow begins to increase. The engine air flow is increased in response to an increase in driver demand torque (not shown). Compressors 43 and 40 remain deactivated and air flow through compressors 43 and 40 remains low.

At time t1, the engine air flow exceeds first threshold 520. Valve 60 remains closed and compressor 40 and compressor 43 are activated. Speed of compressor 43 is adjusted to provide the desired engine air flow and speed of compressor 40 is adjusted to a lowest compressor speed that prevents back flow of air through compressor 40 without compressor 40 providing boost or increasing air flow to the engine. Thus, compressor 40 may be operated with a low amount of electrical energy.

Between time t1 and time t2, the engine air flow is maintained at a constant value, but near time t2, the engine air flow begins to increase. The engine air flow is increased in response to an increase in driver demand torque (not shown). Compressors 43 and 40 remain activated and air flow through compressor 43 is increased to provide the desired engine air flow near time t2.

At time t2, the engine air flow exceeds second threshold 522. Valve 60 is closed in response to engine air flow exceeding threshold 522. Compressors 43 and 40 remain activated and the output of compressors 43 and 40 is increased to meet the increased engine air amount. Compressors 43 and 40 are operated at a same speed to provide equal flow through the compressors and reduce the possibility of back flow through the compressors. Although, not shown, flow through compressor 43 may be briefly decreased when flow of compressor 40 is increased to meet the desired engine air flow.

In this way, compressors and a valve may be operated to reduce the possibility of air back flowing through a compressor. Further, electric energy supplied to compressors may be reduced while supplying a desired engine air flow amount.

Referring now to FIG. 6, an alternative engine operating sequence is shown. The sequence of FIG. 6 may be provided via the system of FIG. 2 in cooperation with the method of FIG. 4. The plots shown are time aligned and occur at a same time. Vertical lines at time t10-t12 represent times if interest during the sequence.

The first plot from the top of FIG. 6 is a plot of engine air flow, or alternatively desired engine air flow, versus time. Trace 602 represents engine air flow. The vertical axis represents engine air flow and engine air flow amount increases in the direction of the vertical axis arrow. The horizontal axis represents time and time increases from the left side of the figure to the right side of the figure. Horizontal line 620 represents a first threshold engine air flow amount and horizontal line 622 represents a second threshold engine air flow amount.

The second plot from the top of FIG. 6 is a plot of valve 60 state versus time. Trace 604 represents valve 60 state. The vertical axis represents valve 60 state and valve 60 is open to allow air flow through the valve when trace 604 is at a higher level near the open label. The valve 60 is closed to prevent air flow through the valve 60 when trace 604 is at a lower level near the closed label. The horizontal axis represents time and time increases from the left side of the figure to the right side of the figure.

The third plot from the top of FIG. 6 is a plot of valve 61 state versus time. Trace 606 represents valve 61 state. The vertical axis represents valve 61 state and valve 61 is open to allow air flow through the valve when trace 606 is at a higher level near the open label. The valve 61 is closed to prevent air flow through the valve 61 when trace 606 is at a lower level near the closed label. The horizontal axis represents time and time increases from the left side of the figure to the right side of the figure.

The fourth plot from the top of FIG. 6 is a plot of electric compressor 43 state versus time. Trace 608 represents electric compressor 43 state. The vertical axis represents compressor 43 state and compressor 43 is activated (e.g., supplied with electrical or mechanical power) when trace 506 is at a higher level near the on label. The compressor 43 is deactivated (e.g., not supplied with electrical or mechanical power) when trace 608 is at a lower level near the off label. The horizontal axis represents time and time increases from the left side of the figure to the right side of the figure.

The fifth plot from the top of FIG. 6 is a plot of electric compressor 40 state versus time. Trace 610 represents electric compressor 40 state. The vertical axis represents compressor 40 state and compressor 40 is activated (e.g., supplied with electrical or mechanical power) when trace 610 is at a higher level near the on label. The compressor 40 is deactivated (e.g., not supplied with electrical or mechanical power) when trace 610 is at a lower level near the off label. The horizontal axis represents time and time increases from the left side of the figure to the right side of the figure.

The sixth plot from the top of FIG. 6 is a plot of compressor 43 versus time. Trace 612 represents compressor 43 air flow. The vertical axis represents compressor 43 air flow and compressor 43 air flow amount increases in the direction of the vertical axis arrow. The horizontal axis represents time and time increases from the left side of the figure to the right side of the figure.

The seventh plot from the top of FIG. 6 is a plot of compressor 40 versus time. Trace 614 represents compressor 40 air flow. The vertical axis represents compressor 40 air flow and compressor 40 air flow amount increases in the direction of the vertical axis arrow. The horizontal axis represents time and time increases from the left side of the figure to the right side of the figure.

At time t10, the engine air flow is less than first threshold 620. Valve 60 and valve 61 are opened and compressors 43 and 40 are deactivated in response to the engine air flow amount. Air flow through compressors 43 and 40 is very low since the compressors are deactivated. By opening valve 60, compressors 33 and 30 may supply air to engine 10 via a low resistance air passage. Further, opening valve 61 may equalize whatever small amount of air may pass through compressor 43 and compressor 40.

Between time t10 and time t11, the engine air flow is maintained at a constant value, but near time t11, the engine air flow begins to increase. The engine air flow is increased in response to an increase in driver demand torque (not shown). Compressors 43 and 40 remain deactivated and air flow through compressors 43 and 40 remains low.

At time t11, the engine air flow exceeds first threshold 620. Valves 60 and 61 are closed, compressor 40 is deactivated, and compressor 43 is activated in response to engine air flow exceeding first threshold 620. Speed of compressor 43 is adjusted to provide the desired engine air flow. Closing valve 61 prevents air backflow through compressor 40, so that electrical energy may be conserved via deactivating compressor 40.

Between time t11 and time t12, the engine air flow is maintained at a constant value, but near time t12, the engine air flow begins to increase. The engine air flow is increased in response to an increase in driver demand torque (not shown). Compressor 43 remains activated and compressor 40 remains deactivated. Air flow through compressor 43 is increased to provide the desired engine air flow near time t12. Valves 60 and 61 remain closed.

At time t12, the engine air flow exceeds second threshold 622. Valve 60 remains closed and valve 61 is opened in response to engine air flow exceeding threshold 622. Compressors 43 remains activated and compressor 40 is activated in response to engine air flow exceeding threshold 622. Further, the output of compressors 43 and 40 is increased to meet the increased engine air amount. Compressors 43 and 40 are operated at a same speed to provide equal flow through the compressors and reduce the possibility of back flow through the compressors. Although, not shown, flow through compressor 43 may be briefly decreased when flow of compressor 40 is increased to meet the desired engine air flow.

In this way, compressors and valves may be operated to reduce the possibility of air back flowing through a compressor. Further, electric energy supplied to compressors may be reduced while supplying a desired engine air flow amount.

As will be appreciated by one of ordinary skill in the art, methods described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, vehicles including electric, hybrid, or internal combustion engine propulsion systems could use the present description to advantage.

The invention claimed is:

1. A method for operating an engine, comprising:
opening a valve and activating a third compressor and a fourth compressor in response to an engine air flow being greater than a first threshold amount and less than a second threshold amount, the third compressor, the fourth compressor, and the valve positioned in an air intake of an engine upstream of an engine throttle and downstream of a first compressor and a second compressor; and
adjusting a speed of the third compressor to provide a desired engine air flow; and
adjusting a speed of the fourth compressor to a lowest speed that prevents backflow through the fourth compressor.

2. The method of claim 1, where the first and second compressors are compressors of turbochargers.

3. The method of claim 1, where adjusting a position of the valve includes closing the valve in response to the engine air flow amount exceeding the second threshold amount and opening the valve in response to the engine air flow amount being less than the second threshold amount.

4. The method of claim 3, where closing the valve closes a first air passage that is in parallel with a second air passage that includes the third compressor.

5. The method of claim 4, where the first air passage is in parallel with a third air passage that includes the fourth compressor.

6. The method of claim 5, further comprising adjusting speed of the fourth compressor in response to the engine air flow amount exceeding the second threshold amount.

7. The method of claim 1, further comprising adjusting the engine air flow amount in response to accelerator pedal position.

8. A method for operating an engine, comprising:
adjusting speed of a third compressor and a position of a first valve and a position of a second valve in response to an engine air flow amount, the third compressor positioned in a first air intake passage and the first valve positioned in a second air intake passage of an engine located upstream of an engine throttle, the third compressor positioned in the first air intake passage downstream of a first compressor and a second compressor, where the second valve is positioned in a third air intake passage that is in parallel with the first and second air intake passages, and where adjusting the position of the first valve and the position of the second valve includes opening the first valve and opening the second valve in response to the engine air flow amount being less than a first threshold level; and
a fourth compressor positioned in the third air intake passage.

9. The method of claim 8, where adjusting the position of the first valve and the position of the second valve includes closing the first valve and closing the second valve in response to the engine air flow amount exceeding the first threshold level.

10. The method of claim 8, where adjusting the position of the first valve and the position of the second valve includes closing the first valve and opening the second valve in response to the engine air flow amount exceeding a second threshold level.

11. The method of claim 10, further comprising adjusting a speed of the fourth compressor to match to a speed of the third compressor in response to the engine air flow amount exceeding the second threshold level.

12. A vehicle system, comprising:
an engine including two cylinder banks and four compressors, a first compressor and a second compressor of the four compressors positioned upstream of a third compressor and a fourth compressor included in the four compressors, the third compressor positioned in a first intake passage, the fourth compressor positioned in a third intake passage, and a first valve positioned in a second intake passage, the first, second, and third intake passages arranged in parallel; and
a controller including executable instructions stored in non-transitory memory to adjust a speed of the third compressor to a first speed and adjust a speed of the fourth compressor to a lowest speed that prevents backflow through the fourth compressor in response to an engine air flow greater than a first threshold and less than a second threshold, and additional instructions to adjust the speed of the third compressor to a speed equal to the speed of the fourth compressor in response to the engine air flow being greater than the second threshold.

13. The vehicle system of claim 12, further comprising a second valve, the second valve positioned in the third intake passage, the first, second, and third intake passages arranged upstream of an engine throttle.

14. The vehicle system of claim 13, where the third and fourth compressors are electrically driven compressors.

15. The vehicle system of claim 14, further comprising the controller including executable instructions stored in non-transitory memory to adjust a position of the first valve in response to an engine air flow amount.

16. The vehicle system of claim 15, further comprising additional instructions to adjust a position of the second valve in response to an engine air flow amount.

17. The vehicle system of claim 16, further comprising instructions to operate the third and fourth compressors at different speeds in response to an engine air flow amount.

* * * * *